(12) United States Patent
Xu

(10) Patent No.: US 8,242,368 B2
(45) Date of Patent: Aug. 14, 2012

(54) CABLE PROTECTION DEVICE

(75) Inventor: Dun-Lv Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 297 days.

(21) Appl. No.: 12/637,007

(22) Filed: Dec. 14, 2009

(65) Prior Publication Data
US 2010/0326700 A1 Dec. 30, 2010

(30) Foreign Application Priority Data

Jun. 26, 2009 (CN) .......................... 2009 1 0303748

(51) Int. Cl.
*H02G 15/04* (2006.01)
(52) U.S. Cl. .................................... 174/74 R; 174/75 C
(58) Field of Classification Search ................ 174/74 R, 174/75 C, 88 C
See application file for complete search history.

(56) References Cited

U.S. PATENT DOCUMENTS

| | | | | |
|---|---|---|---|---|
| 2,691,058 A | * | 10/1954 | Millar | 174/36 |
| 2,782,060 A | * | 2/1957 | Appleton | 285/248 |
| 3,291,895 A | * | 12/1966 | Van Dyke | 174/88 C |
| 3,647,934 A | * | 3/1972 | Hurtt | 174/652 |
| 3,895,832 A | * | 7/1975 | Ellis et al. | 285/322 |
| 4,000,918 A | * | 1/1977 | Reker | 285/93 |
| 4,145,075 A | * | 3/1979 | Holzmann | 285/81 |
| 4,250,348 A | * | 2/1981 | Kitagawa | 174/655 |
| 4,358,079 A | * | 11/1982 | Navarro | 248/56 |
| 4,738,636 A | * | 4/1988 | Bolante | 439/462 |

* cited by examiner

*Primary Examiner* — Chau Nguyen
(74) *Attorney, Agent, or Firm* — Altis Law Group, Inc.

(57) ABSTRACT

A cable protection device includes a protective conduit and a fixing mechanism fixing the protective conduit on a cable. The fixing mechanism includes a clamping member and a latching member. The clamping member includes a first threading portion sleeved on the cable and multiple clamping claws extending from one end of the first threading portion. The latching member includes a main body having a first end surface and a second end surface, the main portion defining a mounting hole in the first end surface, the mounting hole having many inner threads adjacent to the first end surface, and an inner resisting surface adjoining the inner threads. The protective conduit is fixed to the first end surface. The clamping claws are pressed by the resisting surface to fixedly clamp the cable when the first threading portion is received in the latching member with the inner threads.

12 Claims, 3 Drawing Sheets

# CABLE PROTECTION DEVICE

BACKGROUND

1. Technical Field

The present disclosure generally relates to protection devices and, particularly, to a cable protection device fixedly sleeved on a part of a cable.

2. Description of Related Art

A cable is often accompanied by a cable protection device fixed to a part thereof for a specific use or situation. Typically, the cable protection device includes a protective conduit, a fastener member, and a fixing member. The protective conduit is sleeved on the cable. The fastener member is sleeved on the protective conduit, with one end of the fastener member clamping the protective conduit on the cable. The fixing member is screwed on the end of the fastener member to adjust the pressure of the fastener member applied to the protective conduit.

However, the fastener member and the fixing member do not clamp the cable directly. Thus, if external force is applied to the cable or the fastener member that exceeds a maximum friction force between the cable and the protective conduit, the protective conduit may separate from the protected part of the cable. If the protective conduit is of rigid material, the likelihood of separation from the cable is even more pronounced.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
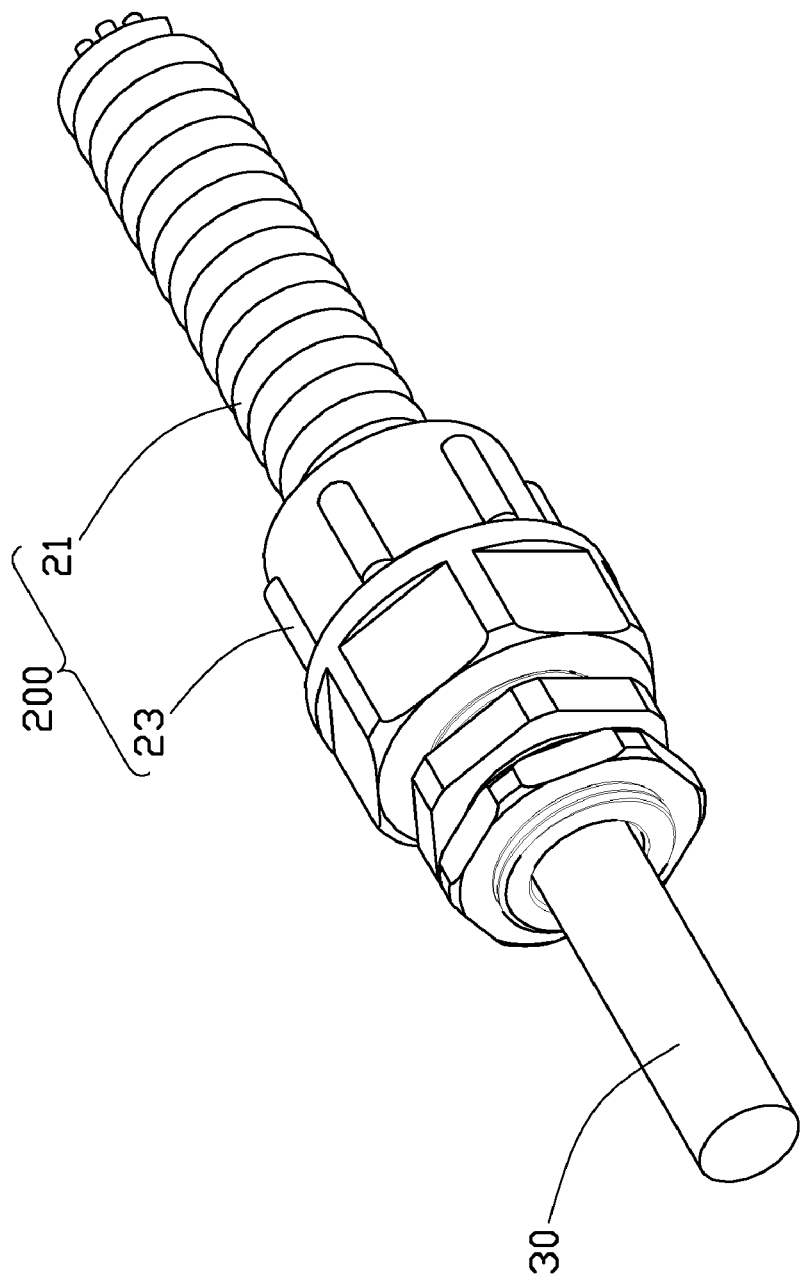
FIG. 1 is an assembled, isometric view of a first embodiment of a cable protection device assembled with a cable.

Referring to FIG. 1, an embodiment of a cable protection device 200 includes a protective conduit 21 and a fixing mechanism 23 fixing the protective conduit 21 on a part of a cable 30. The cable 30 can be a multi-core, simplex, optical, or any other cable. The protective conduit 21 can be plastic, rubber, metal, metal hose, or any other material. In the illustrated embodiment, the cable 30 is a multi-core cable and protective conduit 21 is a metal hose.

Figure 2:
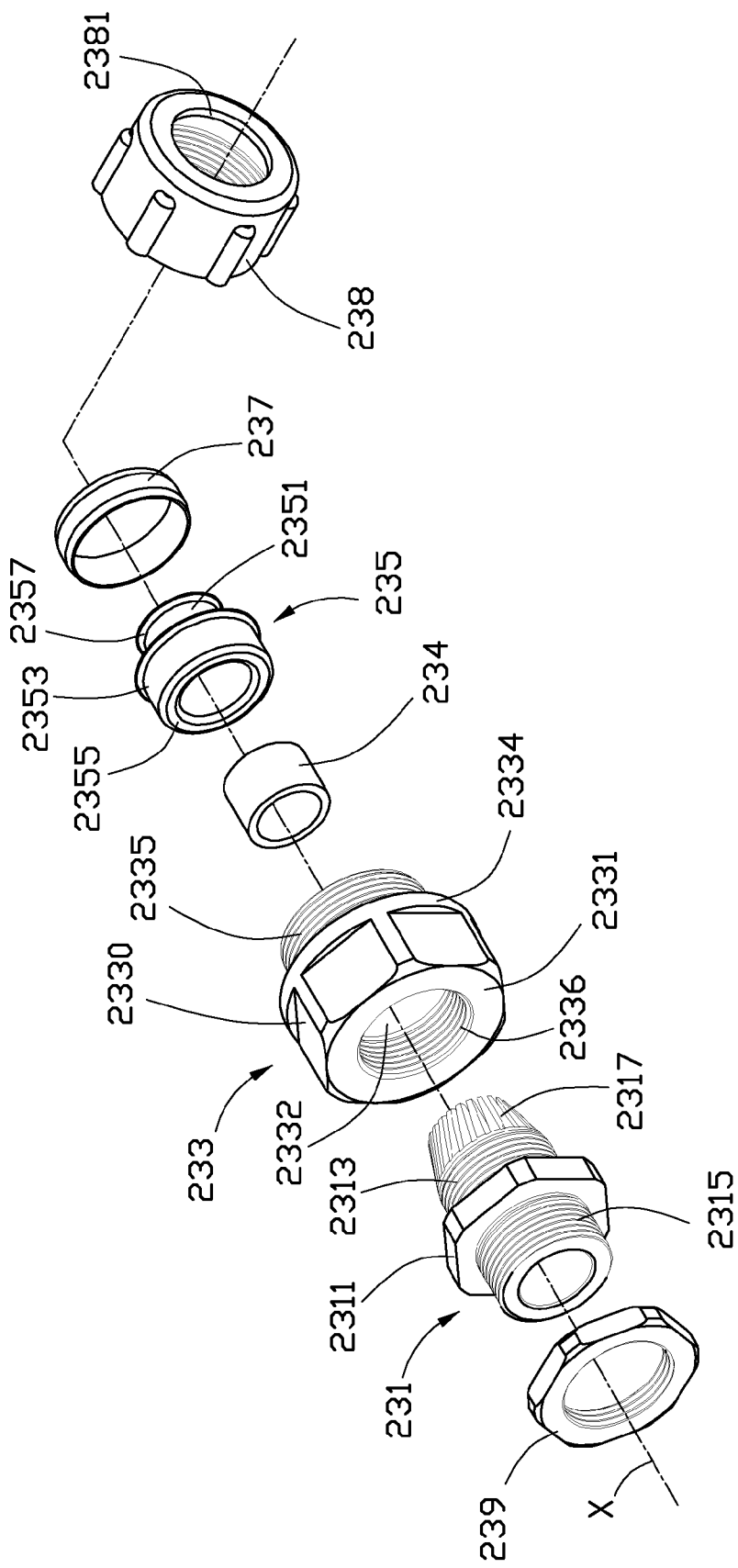
FIG. 2 is an exploded, isometric view of the cable protection device of FIG. 1.
Figure 3:
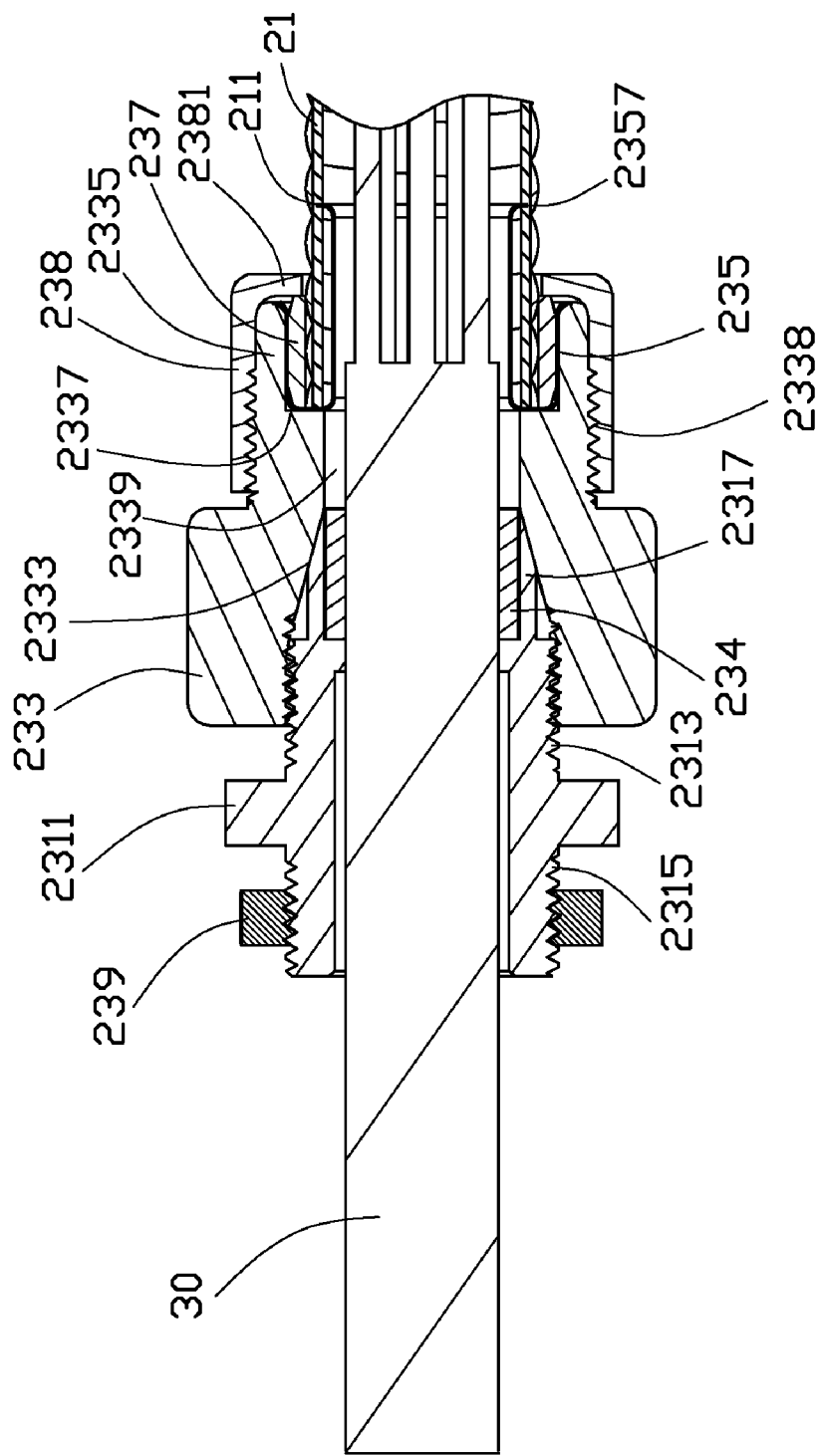
FIG. 3 is a cross section of the cable protection device of FIG. 1, taken along line III-III.

Referring to FIGS. 2 and 3, in the illustrated embodiment, the fixing mechanism 23 includes a clamping member 231, a latching member 233, an inner sleeve 234, a protective sleeve 235, an outer sleeve 237, a fastener member 238, and a fixing nut 239.

The clamping member 231 is a substantially columnar sleeve. The clamping member 231 includes a first threading portion 2313, a second threading portion 2315, and a flange rim 2311 interconnecting the first threading portion 2313 and the second threading portion 2315. The clamping member 231 further includes a plurality of clamping claws 2317 extending from an end of the first threading portion 2313 away from the flange rim 2311. The clamping claws 2317 can be pressed to approach a center axis X of the clamping member 231.

The latching member 233 includes a substantially columnar main portion 2330 and a substantially columnar fixing portion 2335. The main portion 2330 includes a first end surface 2331 and a second end surface 2334 opposite to the first end surface 2331. The fixing portion 2335 extends from the second end surface 2334 of the main portion 2330. The main portion 2330 defines a mounting hole 2332 in the first end surface 2331. The mounting hole 2332 includes a plurality of inner threads 2336 defined at an inner surface of the mounting hole 2332 adjacent to the first end surface 2331, and an inner resisting surface 2333 adjoining the inner threads 2336. The latching member 233 is fixed to the clamping member 231 by the first threading portion 2313 engaging the inner threads 2336 in the mounting hole 2332 of the main portion 2330. The inner resisting surface 2333 is a frustum conical inner surface. A diameter of the inner resisting surface 2333 progressively decreases with distance from the first end surface 2331.

The inner sleeve 234 can be a soft plastic sleeved on the cable 30. An inner surface of the inner sleeve 234 can be unsmoothed. The clamping member 231 is sleeved on the cable 30, and the clamping claws 2317 clamp on the inner sleeve 234. The fixing nut 239 engages the second threading portion 2315. The first threading portion 2313 may be received in the mounting hole 2332 along the inner threads 2336 of the latching member 233. At this time, the clamping claws 2317 are pressed by the resisting surface 2333 of the main body 2330 to fixedly clamp the cable 30 with the inner sleeve 234.

In the illustrated embodiment, the protective conduit 21 is fixed to the fixing portion 2335 of the latching member 233 via the protective sleeve 235, the outer sleeve 237, and the fastener member 238. The latching member 233 further includes a plurality of outer threads 2338 at an outer surface of the fixing portion 2335. The fixing portion 2335 defines a stepped through hole 2339 communicating with the mounting hole 2332 for the cable 30 to pass through. The stepped through hole 2339 includes a stepped surface 2337.

The protective sleeve 235 includes a substantially cylindrical main body 2351, an annular body 2353 surrounding the main body 2351, and a blocking portion 2355 interconnecting the main body 2351 and the annular body 2353 at first ends of the main body 2351 and the annular body 2353. The protective sleeve 235 further includes an annular latching rim 2357 extending from a second end of the main body 2351 that is away from the blocking portion 2355. An inner diameter of the outer sleeve 37 matches with an outer diameter of the protective conduit 21. Two ends of the outer sleeve 37 are beveled. The fastener member 238 can be a nut screwed with the fixing portion 2335. The fastener member 238 further includes a limiting portion 2381 at one end of the fastener member 238.

The protective conduit 21 defines an annular latching groove 211 at an inner surface of the protective conduit 21 corresponding to the annular latching rim 2357 of the protective sleeve 235 adjacent to one end thereof. The outer sleeve 237 is sleeved on one end of the protective conduit 21. The protective sleeve 235 engages with the end of protective conduit 21 and the outer sleeve 237. The main body 2351 is received in an inner side of the protective conduit 21 and the annular latching rim 2357 is mounted into the annular latching groove 211, such that the end of the protective conduit 21 and the outer sleeve 237 are blocked by the blocking portion 2355 and fixed between the main body 2351 and the annular body 2353.

The fastener member 238 is sleeved on protective conduit 21 and engages the outer threads 2338 of the fixing portion 2335. At this time, the protective sleeve 235, the outer sleeve 237 and the end of the protective member 21 are assembled into the stepped through hole 2339, and limited by the limiting portion 2381. The protective sleeve 235 and the outer sleeve 237 are positioned between the stepped surface 2337 of the fixing portion. Thus, the end of the protective conduit 21 is sleeved on a split part of the cable 30 and tightly fixed to the fixing portion 2335 of the latching member 233.

It is to be understood that the inner sleeve 234, the protective sleeve 235, and the outer sleeve 237 can be omitted. In alternative embodiments, the end of the protective conduit 21 can be directly fixed to the second end surface 2334 of the main portion 2330 of the latching member 233 by welding or adhesive, or the end of the protective conduit 21 engaging the fixing portion 2335 of the main portion 2330 of the latching member 233.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A cable protection device for protecting a part of a cable, comprising:
    a protective conduit sleeved on the cable; and
    a fixing mechanism fixing the protective conduit on the cable, the fixing mechanism comprising:
    a clamping member comprising a first threading portion sleeved on the cable and a plurality of clamping claws extending from one end of the first threading portion to clamp the cable;
    a latching member comprising a main portion comprising a first end surface and a second end surface opposite to the first end surface, the main portion defining a mounting hole in the first end surface, the mounting hole comprising a plurality of inner threads defined at an inner surface thereof adjacent to the first end surface, and an inner resisting surface adjoining the inner threads; and
    a protective sleeve comprising a substantially cylindrical main body, an annular body surrounding the main body, and a blocking portion interconnecting the main body and the annular body, wherein a first end of the protective conduit is fixed to the second end surface; the clamping claws are pressed by the resisting surface of the main portion to fixedly clamp the cable when the first threading portion is received in the latching member with the inner threads, the blocking portion is fixed at an end of the main portion of the latching member adjacent to the second end surface, and an end of the main body away from the blocking portion engages with the protective conduit.

2. The cable protection device of claim 1, wherein the latching member further comprises a fixing portion extending from the second end surface of the main portion, the first end of the protective conduit fixed on the fixing portion.

3. The cable protection device of claim 2, wherein the fixing portion comprises a plurality of outer threads at an outer surface of the fixing portion, and a stepped through hole defined therein to communicate with the mounting hole to pass through the cable.

4. The cable protection device of claim 1, wherein the protective conduit defines an annular latching groove at an inner surface thereof adjacent to the first end thereof; the protective sleeve further comprises an annular latching rim extending from one end of the main body that is away from the blocking portion; the main body of the protective sleeve is received in an inner side of the protective conduit, and the annular latching rim is mounted into the annular latching groove, such that the first end of the protective conduit is blocked by the blocking portion and fixed between the main body and the annular body.

5. The cable protection device of claim 4, further comprising a fastener member sleeved on protective conduit engaging the outer threads of the fixing portion, wherein the fastener member comprises a limiting portion at one end thereof; the protective sleeve and the end of the protective member are assembled into the stepped through hole, and limited by the limiting portion correspondingly.

6. The cable protection device of claim 5, further comprising an outer sleeve sleeved on the end of the protective conduit correspondingly, and fixed between the annular body of the protective sleeve and the protective conduit in the stepped through hole of the latching member.

7. The cable protection device of claim 1, wherein the inner resisting surface is a frustum conical inner surface, and a diameter of the inner resisting surface progressively decreases with distance from the first end surface of the latching member.

8. The cable protection device of claim 1, further comprising an inner sleeve sleeved on the cable, the clamping claws clamping the inner sleeve correspondingly.

9. The cable protection device of claim 8, wherein the inner sleeve is soft plastic sleeve, and an inner surface of the inner sleeve is a rough surface.

10. The cable protection device of claim 1, wherein the cable is a multi-core cable, a simplex cable, or an optical cable.

11. The cable protection device of claim 1, wherein the protective conduit is a plastic conduit, a rubber conduit, a metal conduit, or a metal hose.

12. The cable protection device of claim 1, wherein the clamping member further comprises a second threading portion, and a flange rim interconnecting the first threading portion and the second threading portion, wherein the second threading portion is separated from the clamping claws.

* * * * *